US009538724B2

(12) United States Patent
Yeum

(10) Patent No.: US 9,538,724 B2
(45) Date of Patent: Jan. 10, 2017

(54) EAR TAG FOR RECOGNIZING LIVESTOCK INDIVIDUAL

(71) Applicant: HANA MICRON INC., Chungcheongnam-do (KR)

(72) Inventor: Sang Yeul Yeum, Gyeonggi-do (KR)

(73) Assignee: Hana Micron Inc., Chungcheongnam-do (KR)

( * ) Notice: Subject to any disclaimer, the term of this patent is extended or adjusted under 35 U.S.C. 154(b) by 0 days.

(21) Appl. No.: 14/908,412

(22) PCT Filed: Jul. 29, 2014

(86) PCT No.: PCT/KR2014/006949
§ 371 (c)(1),
(2) Date: Mar. 25, 2016

(87) PCT Pub. No.: WO2015/016588
PCT Pub. Date: Feb. 5, 2015

(65) Prior Publication Data
US 2016/0192622 A1     Jul. 7, 2016

(30) Foreign Application Priority Data
Jul. 30, 2013   (KR) .................. 10-2013-0090284

(51) Int. Cl.
*A01K 11/00*     (2006.01)
*G06K 19/077*    (2006.01)

(52) U.S. Cl.
CPC ....... *A01K 11/004* (2013.01); *G06K 19/07758* (2013.01)

(58) Field of Classification Search
CPC ......................... A01K 11/004; A01K 11/001
See application file for complete search history.

(56) References Cited

U.S. PATENT DOCUMENTS 4,209,924 A * 7/1980 Fearing ............... A01K 11/001
                                                      40/301
4,674,445 A * 6/1987 Cannelongo ........... A01K 11/00
                                                      119/651

(Continued)

FOREIGN PATENT DOCUMENTS

KR   10 2006 0043169   5/2006
KR   10 2013 0019970   2/2013

*Primary Examiner* — Gary Hoge
(74) *Attorney, Agent, or Firm* — Reinhart Boerner Van Deuren P.C.

(57) ABSTRACT

An ear tag for recognizing livestock individual is provided. The ear tag for recognizing livestock individual according to the present invention includes a cover unit including a first cover unit and a second cover unit, where the first cover unit faces a skin side of livestock, and the first cover unit and the second cover unit integrally coupled with each other, a wireless communication unit arranged between the first cover unit and the second cover unit and including at least one wireless communication chip, a male plug configured to penetrate through a part of a body of the livestock and a through hole formed on the first cover unit and including a distal end configured to be engaged with a space of a female unit formed on the second cover unit, and a folding portion including at least one first folding line formed in a groove with a predetermined length on an outer surface of the cover unit between a head area of the cover unit corresponding to the male plug and a body area of the cover unit corresponding to the wireless communication unit to allow a stress caused by an external force to be concentrated on the folding portion so that the cover unit is folded along the first folding line when the cover unit is bent.

6 Claims, 8 Drawing Sheets

(56) References Cited

U.S. PATENT DOCUMENTS

| | | | | |
|---|---|---|---|---|
| 4,721,064 A | * | 1/1988 | Denk | A01K 11/001 |
| | | | | 119/655 |
| 4,748,757 A | * | 6/1988 | Howe | A01K 11/001 |
| | | | | 40/301 |
| 4,750,284 A | * | 6/1988 | Parry | A01K 11/001 |
| | | | | 119/655 |
| 5,189,986 A | * | 3/1993 | Burkoth | A01K 11/001 |
| | | | | 119/655 |
| 7,533,482 B2 | | 5/2009 | Huenefeld | |
| 2002/0148146 A1 | * | 10/2002 | Hogan | A01K 11/008 |
| | | | | 40/301 |
| 2006/0202835 A1 | * | 9/2006 | Thibault | A01K 11/004 |
| | | | | 340/573.1 |
| 2008/0314325 A1 | * | 12/2008 | Hempstead | A01K 11/006 |
| | | | | 119/51.02 |
| 2010/0132233 A1 | | 6/2010 | Hilpert | |
| 2011/0203144 A1 | * | 8/2011 | Junek | A01K 11/001 |
| | | | | 40/300 |
| 2013/0175347 A1 | * | 7/2013 | Decaluwe | A01K 11/004 |
| | | | | 235/492 |

* cited by examiner

Fig. 2
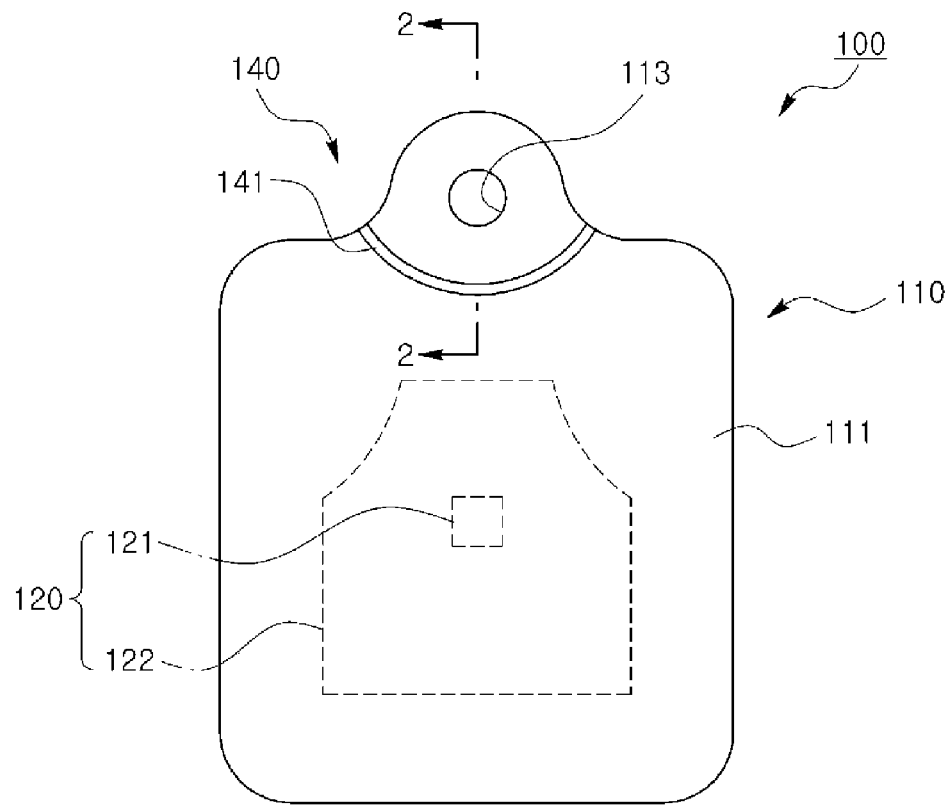
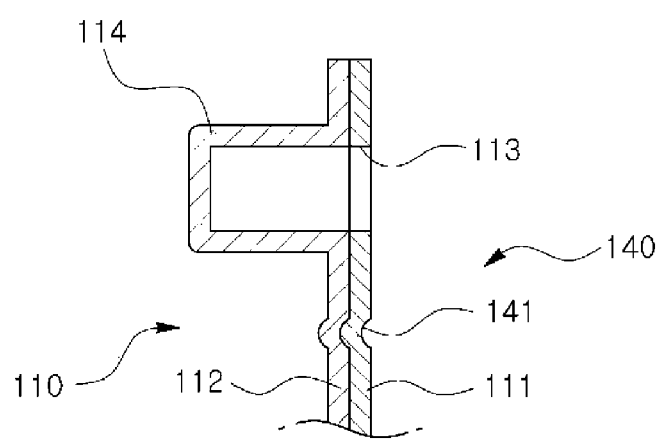
2 - 2

Fig. 5
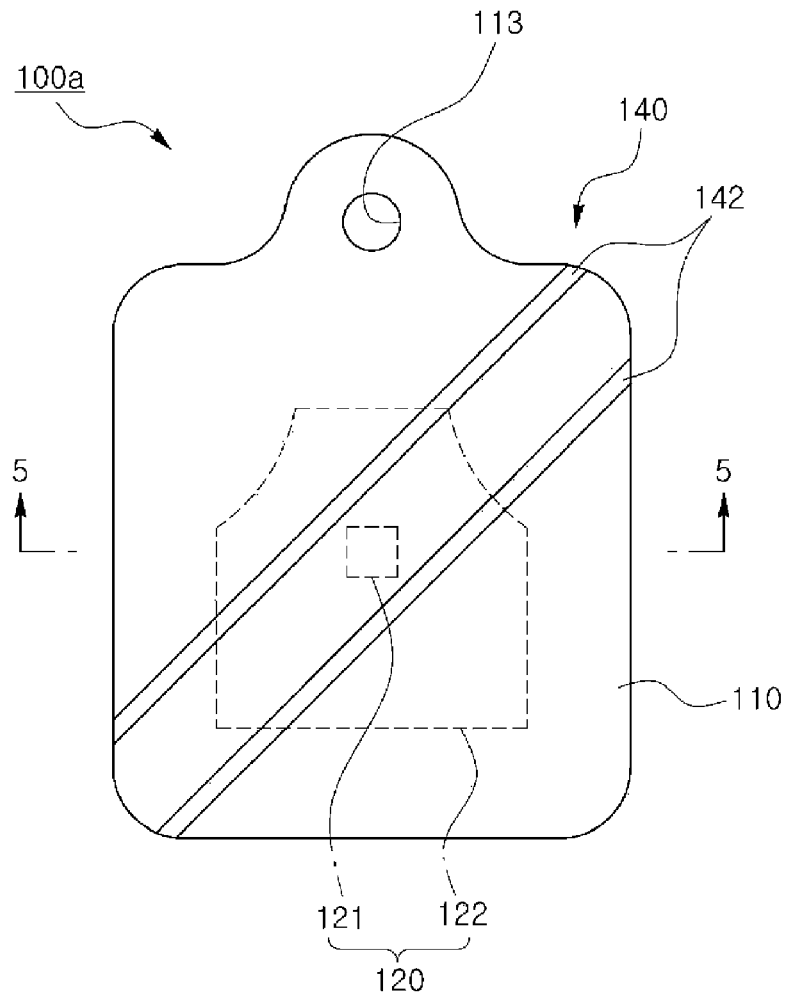
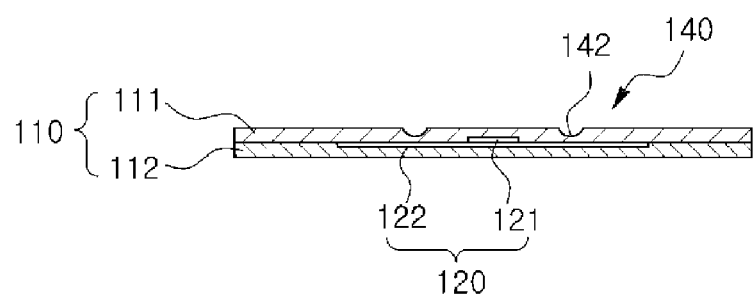
5 – 5

8 – 8

EAR TAG FOR RECOGNIZING LIVESTOCK INDIVIDUAL

TECHNICAL FIELD

The present disclosure relates to an ear tag, and more particularly, to an ear tag for recognizing livestock individual, which is capable of protecting a wireless communication chip by folding a specific portion of a cover, which is separated from the wireless communication chip, when the cover unit is bent by an external force generated in livestock industry environment not to cause a stress to be concentrated in an area corresponding to the wireless communication chip, preventing a damage on the wireless communication chip, and minimizing influence of the external force on the wireless communication chip.

BACKGROUND

In general, a farm that breeds livestock such as cattle and pigs facilitates management of the livestock by attaching an identification tag including information on livestock individual on an ear or the like of the livestock.

In recent years, with development of various wireless communication technologies, the wireless communication technology has been grafted onto the identification tag for managing the livestock individual, which has led to a development of various types of identification tags in order to improve the efficiency in the management of the livestock individual.

Among the technologies for managing the livestock individual onto which the wireless communication technology has been grafted, livestock individual management technology to which an RFID (Radio Frequency Identification) technology is applied is widely employed, because this technology has various advantages over other technologies.

The RFID technology includes an RFID tag and an RFID reader, and recognizes information from a distance, in which the RFID tag records information in an integrated circuit and transmits the information to the reader via an antenna. When the reader receives the information, the received information is used to identify a subject to which the RFID tag is attached.

That is, a difference between the RFID and a barcode system is that the RFID reads the information by using radio wave instead of using light. Therefore, unlike the barcode reader that works in a short distance, the RFID is capable of reading the information from a distance and even receiving the information through an intervening object between the RFID and the subject.

The RFID can be classified depending on a type of power used. An RFID that reads information from a chip performs a communication based on a power of the reader is classified as a passive RFID.

An RFID that includes a built-in battery to read information from a chip based on a power of the battery and performs a communication based on a power of the reader is classified as a semi-passive RFID.

Lastly, an RFID that reads information from a chip and performs a communication based on a power of the tag is classified as an active RFID.

The RFID can also be classified depending on a frequency of the radio wave used in the communication instead of the type of power used. An RFID using a low frequency is referred to as an "LF RFID (Low-Frequency Radio-Frequency Identification), which uses a radio wave of 120 kHz to 140 kHz. An HF RFID (High-Frequency Radio-Frequency Identification) uses a radio wave of 13.56 MHz, and a UHF RFID (Ultrahigh-Frequency) that uses an even higher frequency uses a radio wave of 868 MHz to 956 MHz.

In a livestock individual management system employing the RFID technology, each livestock individual is provided with an RFID tag, i.e., an identification tag including an antenna and a chipset that is an integrated circuit for RFID communication. Normally, the identification tag for the livestock is attached through a hole perforated on an ear of the livestock individual, and hence it is also referred to as an "ear tag".

Korean Patent Application Laid-Open No. 10-2013-0019970 (2013 Feb. 27) describes an ear tag including a first cover unit facing a skin side of livestock individual, a second cover unit bonded with the first cover unit, and a wireless communication chipset between the first cover unit and the second cover unit.

In such a conventional ear tag, a male plug that is coupled with a bonded structure of the first cover unit and the second cover unit is provided through a hole perforated on an ear of the livestock individual, which is a part of a body of the livestock individual, the first cover unit includes a through hole for passing the male plug, the second cover unit includes a female unit having a space for receiving the male plug, and an unplug preventing member that interferes with the male plug inserted through the through hole to prevent the male plug from being unplugged is provided in the space of the female unit.

However, in such a conventional ear tag, the first and second cover units bonded together to include the wireless communication chip therebetween are made of soft material such as polyurethane, and hence the first and second cover units that are straight are easily bent in a U-shape by an external force. When the first and second cover units are bent, the bending stress is concentrated on the wireless communication chip that is arranged roughly at the center of the first and second cover units, and the concentrated stress may damage the wireless communication chip that is a core part of the ear tag, which causes degradation of the product reliability.

In particular, a feedbox for storing feed for the livestock such as cattle and pigs is provided outside a cowshed with bars therebetween in the livestock industry environment, and hence an external impact is transferred to the wireless communication chip due to a bending by an external force when the ear tag attached on the ear of the cattle is bumped into the bars or folded with the ear while the cattle puts its head in and out of a space between the bars to take the feed.

Further, when the livestock sleeps or moves while lying on the floor in the cowshed, the ear having the ear tag is folded to cause a bending of the cover unit, which transfers an impact on the wireless communication chip.

Therefore, the wireless communication chip provided in the cover unit is damaged by the external impact transferred from a bending of the ear tag attached on the ear of the cattle due to such external environmental factors in the livestock industry environment. The repeated bending of the ear tag damages the chip and the bonding surface, which eventually disables the wireless communication function.

DISCLOSURE

Technical Problem

The present disclosure has been made in view of the above aspects, and it is an object of the present invention to provide an ear tag for recognizing livestock individual, which is capable of protecting a wireless communication chip by folding a specific portion of a cover unit, which is separated from the wireless communication chip, when the cover unit is bent by an external force generated in livestock industry environment not to cause a stress to be concentrated in an area corresponding to the wireless communication chip, preventing a damage on the wireless communication chip, and minimizing influence of the external force on the wireless communication chip.

The technical object of the present invention is not limited to the above-mentioned, but other objects, features, advantages and technical and industrial significance of this disclosure will be better understood by a person having ordinary skill in the pertinent art by reading the following detailed description of exemplary embodiments of the disclosure.

SUMMARY

In order to achieve the above-mentioned technical object, an ear tag for recognizing livestock individual according to some embodiments of the present invention includes a cover unit including a first cover unit and a second cover unit, where the first cover unit faces a skin side of livestock, and the first cover unit and the second cover unit integrally coupled with each other, a wireless communication unit arranged between the first cover unit and the second cover unit and including at least one wireless communication chip, a male plug configured to penetrate through a part of a body of the livestock and a through hole formed on the first cover unit and including a distal end configured to be engaged with a space of a female unit formed on the second cover unit, and a folding portion including at least one first folding line formed in a groove with a predetermined length on an outer surface of the cover unit between a head area of the cover unit corresponding to the male plug and a body area of the cover unit corresponding to the wireless communication unit to allow a stress caused by an external force to be concentrated on the folding portion so that the cover unit is folded along the first folding line when the cover unit is bent.

It is in some embodiments that the first folding line be formed on outer surfaces of the cover unit on both sides or selectively formed on the outer surface of the cover unit on one side.

It is in some embodiments that the first folding line be formed with both ends extended to respective outer edges of the cover unit.

It is in some embodiments that the first folding line include a curved line or a straight line.

Further, an ear tag for recognizing livestock individual according to some embodiments of the present invention includes a cover unit including a first cover unit and a second cover unit, where the first cover unit faces a skin side of livestock, and the first cover unit and the second cover unit integrally coupled with each other, a wireless communication unit arranged between the first cover unit and the second cover unit and including at least one wireless communication chip, a male plug configured to penetrate through a part of a body of the livestock and a through hole formed on the first cover unit and including a distal end configured to be engaged with a space of a female unit formed on the second cover unit, and a folding portion including at least one second folding line formed in a groove with a predetermined length on the cover unit in an area close to the wireless communication chip without being overlapped with the wireless communication chip and corresponding to the wireless communication unit to allow a stress caused by an external force to be concentrated on the folding portion so that the cover unit is folded along the second folding line when the cover unit is bent.

It is in some embodiments that the second folding line include an oblique line having a predetermined angle with a virtual vertical line passing the wireless communication chip.

It is in some embodiments that the second folding line include a plurality of oblique lines having predetermined angles in opposite directions with a virtual vertical line passing the wireless communication chip in a manner that the plurality of oblique lines intersect with each other around the wireless communication chip.

It is in some embodiments that the second folding line include a vertical line parallel to a virtual vertical line passing the wireless communication chip.

It is in some embodiments that the second folding line be formed on the cover unit on one side corresponding to the wireless communication chip included in the wireless communication unit.

It is more in some embodiments that the second folding line be formed with both ends extended to respective outer edges of the cover unit.

It is more in some embodiments that the ear tag for recognizing livestock individual further include an embossed portion convex by a predetermined height on the outer surface of the cover unit corresponding to the wireless communication chip.

ADVANTAGEOUS EFFECTS

As described above, the present invention has following effects.

(1) Providing a first folding line that defines a boundary line from which a cover unit is folded when the cover unit is bent on an outer surface of the cover unit that includes therein a wireless communication unit including a wireless communication chip and board in a form of groove having a predetermined depth and a predetermined length between a head area of the cover unit coupled with a male plug and a body area of the cover unit in which the wireless communication unit is provided, the cover unit is folded along the first folding line that is distant from the head area of the wireless communication chip so that the stress is concentrated in the folded area, and hence the wireless communication chip and board are prevented from being damaged by the stress generated when the cover unit is bent and having a short-circuit of a circuit pattern, which increases the product liability.

(2) Providing a second folding line that defines a boundary line from which the cover unit is folded when the cover unit is bent on an outer surface of the cover unit that includes therein a wireless communication unit including a wireless communication chip and board in a body area of the cover unit corresponding to the wireless communication unit in a form of groove of a single oblique line, intersecting oblique lines, or a vertical line, the cover unit is folded along the second folding line that is not overlapped with the wireless communication chip so that the stress is concentrated in the folded area, and hence the wireless communication chip and board are prevented from being damaged by the stress generated when the cover unit is bent, which increases the product liability.

BRIEF DESCRIPTION OF DRAWINGS

FIG. 2 is a front view of the ear tag for recognizing livestock individual according to the first embodiment of the present invention.

FIG. 5 is a front view of the ear tag for recognizing livestock individual according to the second embodiment of the present invention.

DETAILED DESCRIPTION

Figure 1:
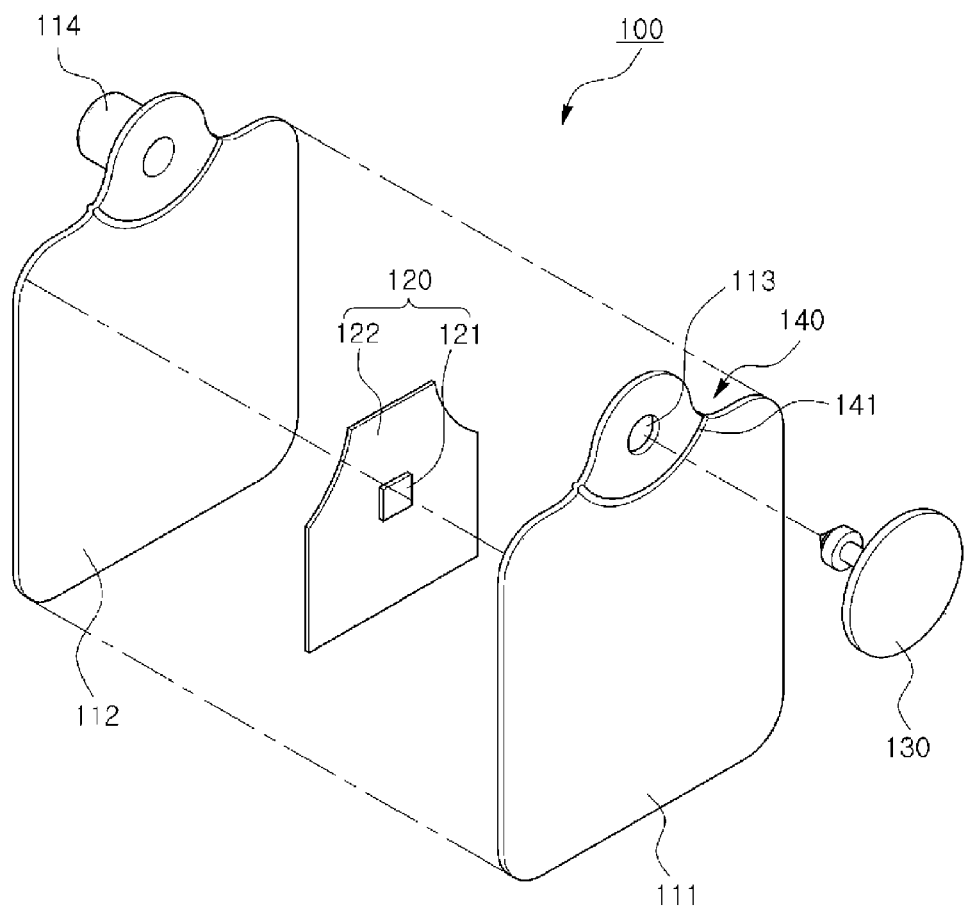
FIG. 1 is an exploded perspective view of an ear tag for recognizing livestock individual according to a first embodiment of the present invention.

Exemplary embodiments of the present invention are described in detail below with reference to the accompanying drawings. However, in a case where a detailed description of related known function or structure may unnecessarily cloud the gist of the present invention in describing the structural principle of the exemplary embodiments, the detailed description thereof is omitted.

In the following description, like reference numerals designate like elements even when the elements are shown in different drawings.

Additionally, in describing the components of the present invention, if a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component. In the entire specification, when a portion "comprises" or "includes" a constituent element, this does not mean to exclude another constituent element unless otherwise described particularly in view of the opposite aspect but means that another constituent element can be further included.

Exemplary embodiments of the present invention are described in detail below with reference to the accompanying drawings.

As shown in FIGS. 1 and 2, an ear tag 100 for recognizing livestock individual according to a first embodiment of the present invention includes a cover unit 110, a wireless communication unit 120, a male plug 130, and a folding portion 140, so as to prevent a wireless communication chip from being damaged when the cover unit is bent due to an external force generated in a poor livestock industry environment.

The cover unit 110 includes a first cover unit 111 and a second cover unit 112. The first cover unit 111 is provided on a side facing a body of the livestock when the ear tag for recognizing livestock individual is attached on a part of the body of the livestock.

The first cover unit 111 includes a plate member having a through hole 113 of a predetermined size through which the male plug 130 is passable, which is used to fix the ear tag on a part of body of the livestock by passing through the part of the body.

The second cover unit 112 includes a female unit 114 having a predetermined space with which a distal end of the male plug 130 is engaged in an area corresponding to the through hole 113 of the first cover unit 111. The female unit 114 is formed to be outwardly protruded.

The second cover unit 112 is tightly bonded with one side of the first cover unit 111 in a mold (not shown), making a plate member to form an ear tag structure for recognizing livestock individual.

It is in some embodiments that the first and second cover units 111 and 112 be formed of a material that does not affect the livestock when the ear tag is brought into contact with the body of the livestock and is elastically deformable by an external force. Such an unharmful and elastically restorable material includes rubber, polyurethane, and the like.

The wireless communication unit 120 is a communication means including a film-type board on which a wireless communication chip 121 for recording information on livestock individual and performing a communication of the information with an external device is mounted and provided between the first cover unit 111 and the second cover unit 112.

The wireless communication chip 121 included in the wireless communication unit includes an RFID (Radio Frequency Identification) communication chipset, which is a chipset having an RFID communication tag function.

The wireless communication unit 120 further includes an antenna (not shown) for performing a wireless communication. Such an antenna can be implemented in a form of a film antenna having a thin thickness. The film antenna includes an antenna having a radiation pattern printed on one side of a nonconductive film with a conductive material, and the radiation pattern and the wireless communication chip are electrically coupled with each other.

The male plug 130 is a separate member that penetrates through an ear of the livestock, which is a part of the body of the livestock as a target subject for recognizing the individual and the through hole 113 formed on the first cover unit 111. The distal end of the male plug 130 is engaged with the space of the female unit 114 formed on the second cover unit 112, by which the male plug 130 is coupled with the cover unit 110.

The folding portion 140 includes a first folding line 141 on which a stress is concentrated when the cover unit 110 is bent by an external force for folding a specific portion of the cover unit 110. The first folding line 141 includes a groove having a predetermined length and a predetermined depth formed continuously on an outer surface of the cover unit 110 corresponding to an area between a head area that is an upper portion of the cover unit 110 corresponding to the male plug 130 and a body area that is the rest of the cover unit 110 corresponding to the wireless communication unit 120.

The first folding line 141 formed in a groove on the outer surface of the cover unit 110 is selectively formed on one side of the cover unit 110 including the first cover unit 111 and the second cover unit 112 or on both sides of the cover unit 110.

Figure 3:
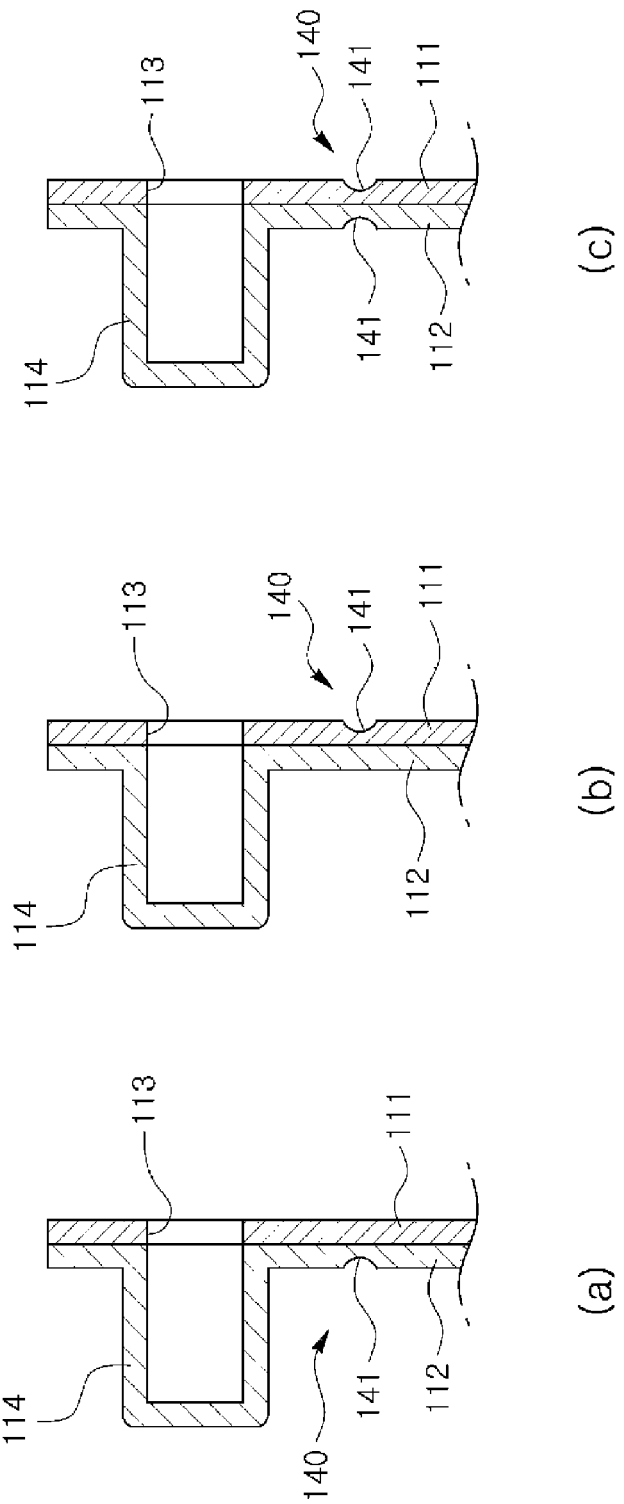
FIG. 3 is a partial cross-sectional view of the ear tag for recognizing livestock individual according to the first embodiment of the present invention, showing various forms of a folding portion included in the ear tag.

That is, as shown in FIG. 3a and FIG. 3b, the first folding line 141 is selectively formed on an outer surface of the first cover unit 111 or an outer surface of the second cover unit 112 respectively corresponding to an outer surface of one side and outer surfaces of both sides of the cover unit 110, or as shown in FIG. 3c, formed on both the outer surface of the first cover unit 111 and the outer surface of the second cover unit 112.

It is in some embodiments that the first folding line 141 be formed with both ends extended to respective outer edges of the cover unit 110 that is a subject to be bent to allow the stress to be concentrated on the folding portion so that the folding portion is easily folded along the folding line when the cover unit 110 is bent by an external force.

The first folding line 141 formed in a groove on the outer surface of the cover unit 110 can be formed by a protruded portion (not shown) of a mold when injection molding the cover unit including the first and second cover units; however, the present invention is not limited to this scheme, but can be alternatively formed in post-process stage on the cover unit that is removed from the mold after being injection molded.

Further, although the first folding line 141 is shown in a concave shape in the drawings, the present invention is not limited to this scheme, but can be alternatively formed in a straight shape.

When the cover unit 110 that is attached on the ear of the livestock by the male plug 130 is bent by an external force caused by various external factors in the livestock industry environment, providing the first folding line 141 formed in a groove with a predetermined depth between the head area of the cover unit 110 where the male plug 130 is engaged and the body area of the cover unit 110 where the wireless communication unit 120 is arranged, the cover unit is folded along the first folding line 141 that is distant from the wireless communication chip toward the head area and the stress is concentrated on the folded portion, and hence the chip or board can be prevented from being damaged and a pattern circuit such as the radiation pattern printed on the board can be prevented from being short-circuited by avoiding the concentration of the stress generated when the cover unit is bent on the wireless communication chip 121 and a board 122 including the chip arranged in the wireless communication unit of the cover unit 110.

Figure 4:
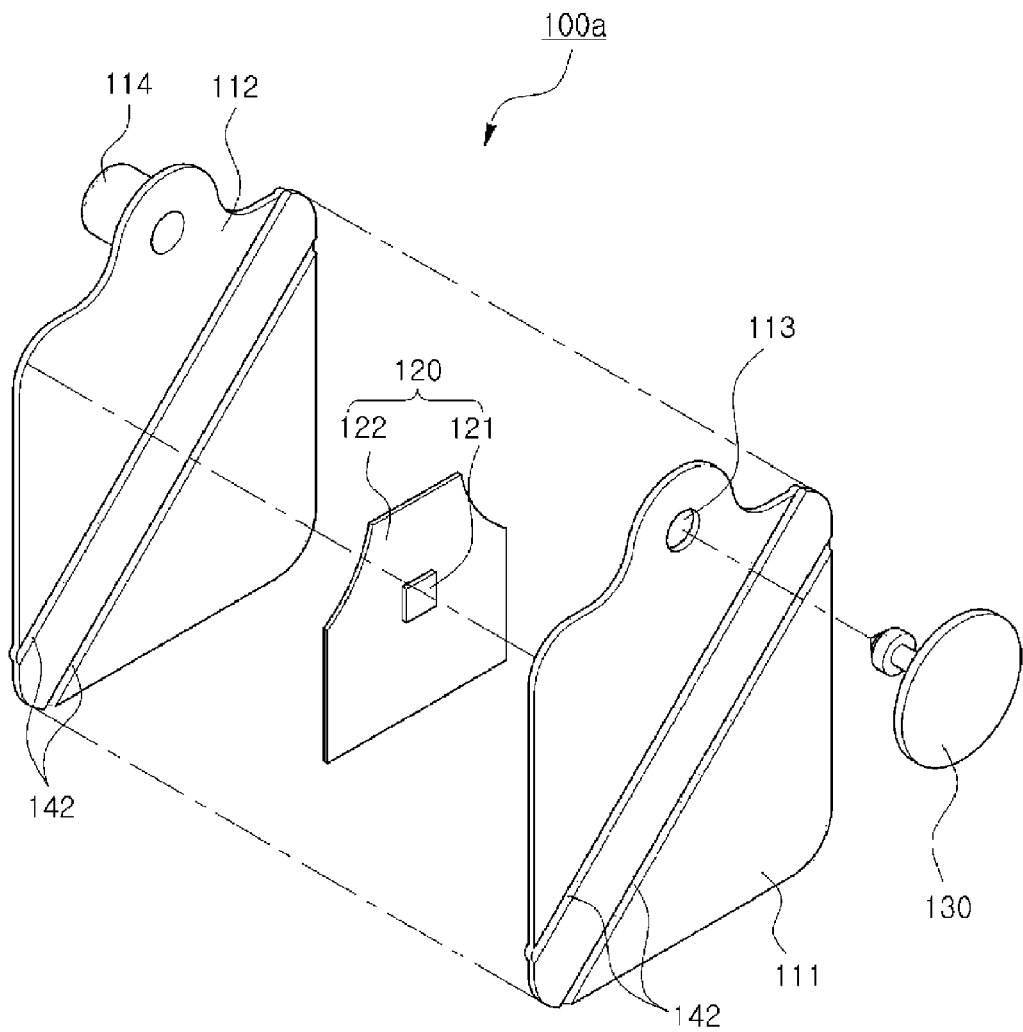
FIG. 4 is an exploded perspective view of an ear tag for recognizing livestock individual according to a second embodiment of the present invention.

As shown in FIGS. 4 and 5, an ear tag 100a for recognizing livestock individual according to a second embodiment of the present invention includes a cover unit 110, a wireless communication unit 120, a male plug 130, and a folding portion 140. The cover unit, the wireless communication unit, and the male plug have configurations and functions similar to those of the first embodiment, and hence each of the units are assigned with the same reference numeral as that of the first embodiment, and a detailed description thereof is omitted.

The folding portion 140 included in the cover unit 110 according to the second embodiment includes a second folding line 142 on which a stress is concentrated when the cover unit 110 is bent by an external force for folding a specific portion of the cover unit 110. The second folding line 142 includes a groove having a predetermined length and a predetermined depth formed continuously on an outer surface of the cover unit in an area close to the wireless communication chip 121 without being overlapped with the wireless communication chip 121 and corresponding to the wireless communication unit 120.

It is in some embodiments that the second folding line 142 formed in a groove on the outer surface of the cover unit 110 be formed on the outer surface of the first cover unit 111 on one side facing the wireless communication chip 121 mounted on the board of the wireless communication unit 120.

The second folding line 142 includes an oblique line having a predetermined angle with a virtual vertical line passing the wireless communication chip 121.

Although the second folding line 142 is shown to include a pair of parallel oblique lines formed in a groove with a predetermined length on the outer surface of the cover unit on one side in an area not corresponding to the wireless communication chip in the drawings, the present invention is not limited to this scheme, but can alternatively include a single oblique line.

Figure 6:
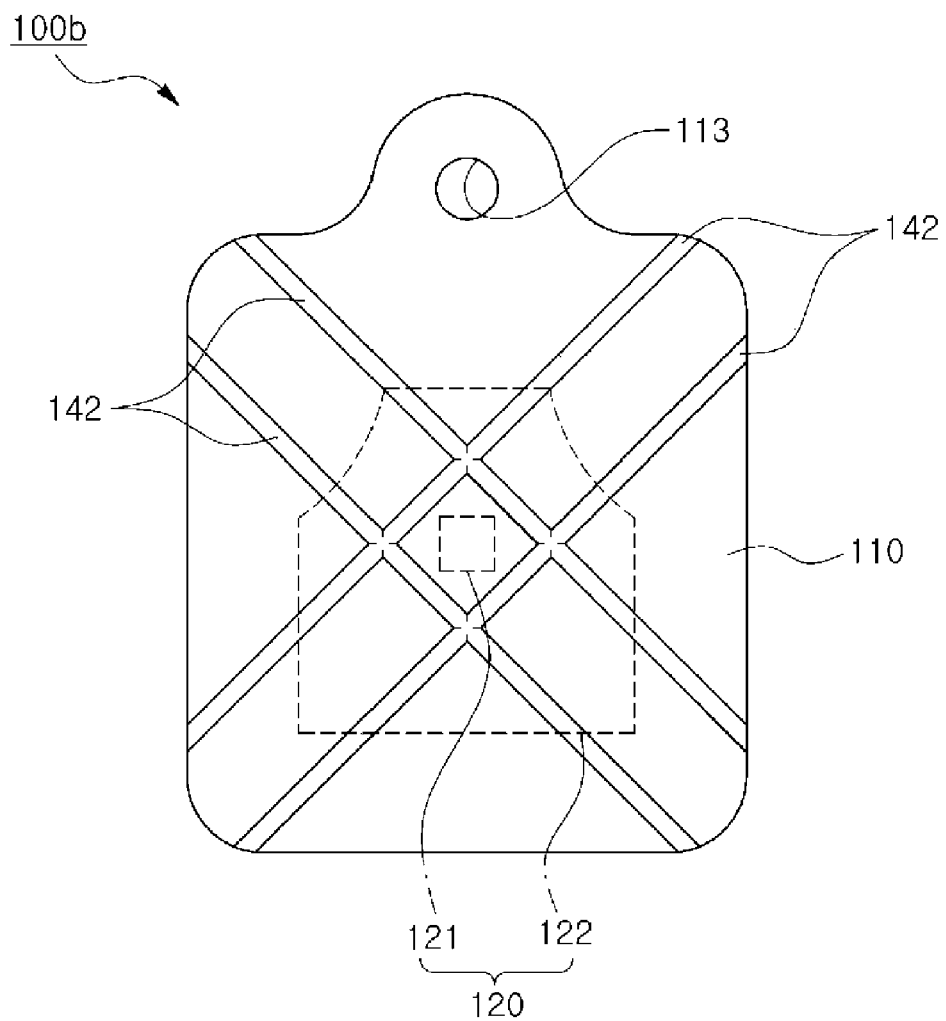
FIG. 6 is a front view of the ear tag for recognizing livestock individual according to a third embodiment of the present invention.

FIG. 6 is a front view of the ear tag for recognizing livestock individual according to a third embodiment of the present invention. As shown in FIG. 6, an ear tag 100b includes a plurality of second folding lines 142 formed to have a predetermined angle on the cover unit 110. The second folding lines 142 are obliquely formed to have predetermined angles in opposite directions with a virtual vertical line passing the wireless communication chip 121 in a manner that the second folding lines 142 intersect with each other around the wireless communication chip 121.

Figure 7:
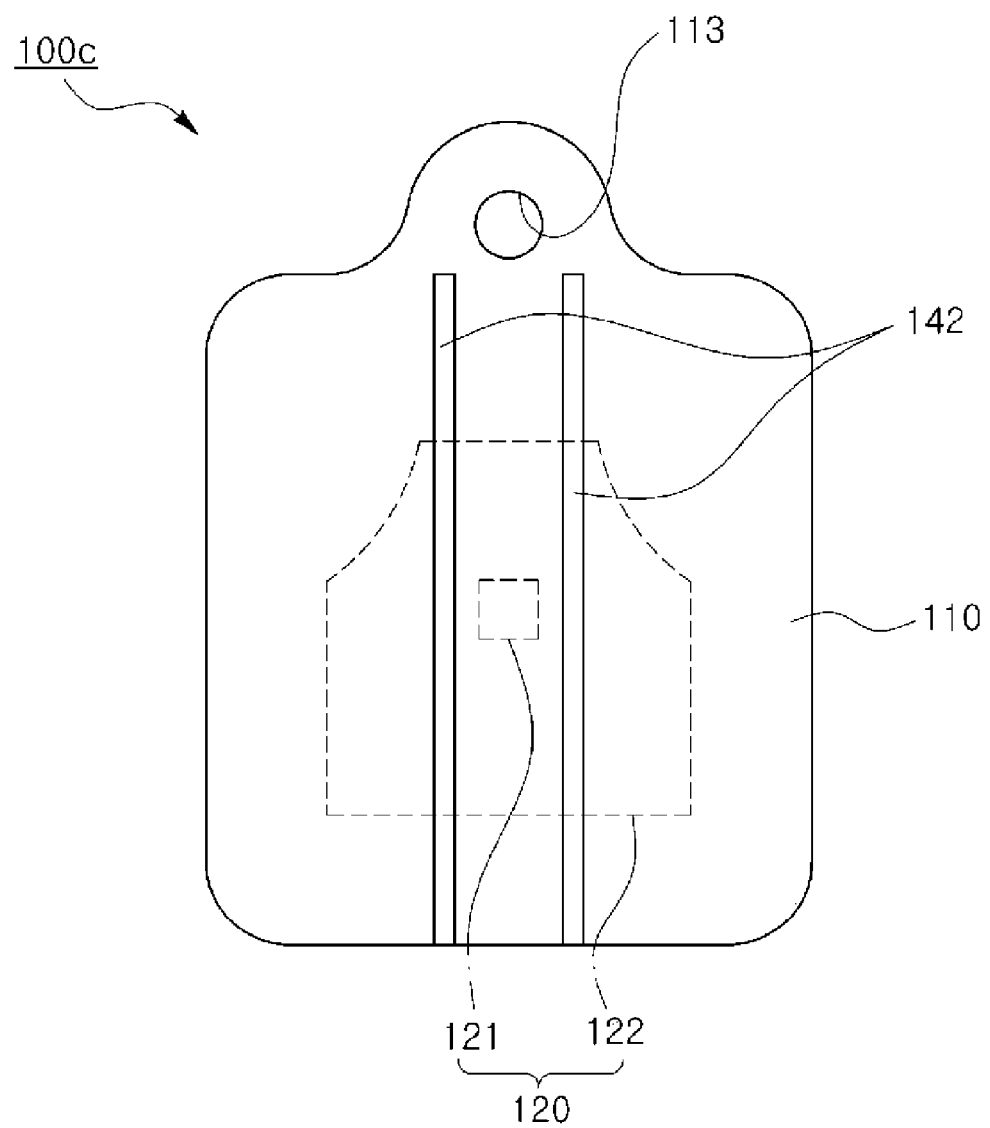
FIG. 7 is a front view of the ear tag for recognizing livestock individual according to a fourth embodiment of the present invention.

FIG. 7 is a front view of the ear tag for recognizing livestock individual according to a fourth embodiment of the present invention. As shown in FIG. 7, an ear tag 100c includes a pair of second folding lines 142 formed on the cover unit 110. The second folding lines 142 are formed in parallel to the virtual vertical line passing the wireless communication chip 121.

With these configurations, when the cover unit 110 attached to the ear of the livestock by the male plug 130 is bent by an external force caused by various external factors in the livestock industry environment, the second folding line 142 can be selectively provided from the oblique lines formed in a groove with a predetermined depth on the outer surface of the cover unit on one side corresponding to the wireless communication unit, intersecting oblique lines, or vertical lines. The stress is then concentrated on the folded portion along the second folding line 142 that is distant from the wireless communication chip 121, and hence the chip that is a core part can be prevented from being damaged by avoiding the concentration of the stress generated when the cover unit 110 is bent on the wireless communication chip 121 arranged in the wireless communication unit of the cover unit 110.

Figure 8:
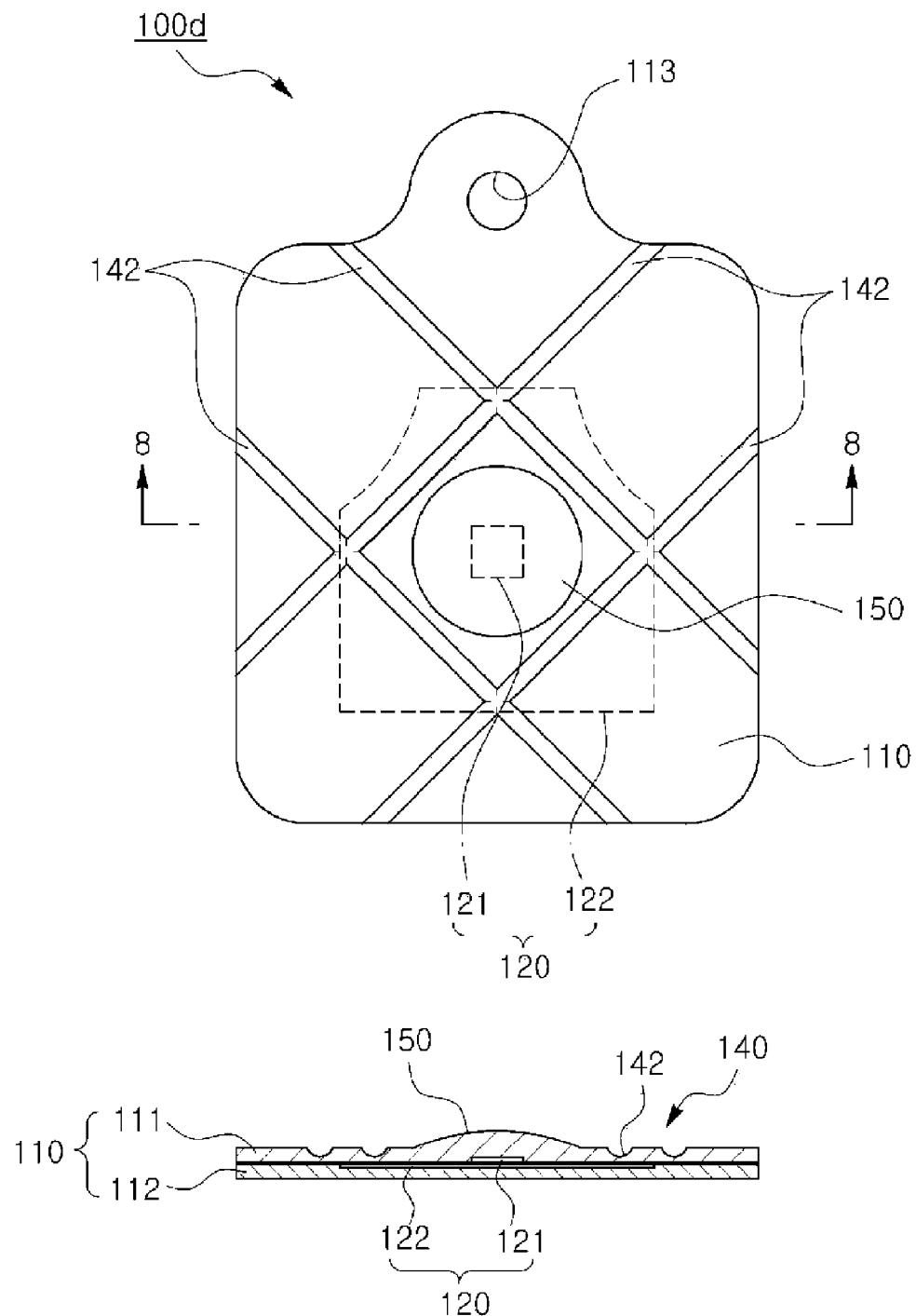
FIG. 8 is a front view of the ear tag for recognizing livestock individual according to a fifth embodiment of the present invention.

FIG. 8 is a front view of the ear tag for recognizing livestock individual according to a fourth embodiment of the present invention. An ear tag 100d includes an embossed portion 150 convex by a predetermined height on the outer surface of the first cover unit 111, which is an outer surface of the cover unit 110 the cover unit 110 corresponding to the wireless communication chip 121 that is a core part included in the wireless communication unit 120.

Although the embossed portion 150 is shown to have a substantially circular convex shape with a predetermined height and an area larger than that of the wireless communication chip and applied to a cover unit including intersecting oblique lines in FIG. 8, the present invention is not limited to this scheme, but can be alternatively formed in various shapes such as an ellipse and a polygon, and can be alternatively applied to a cover unit including the first folding line 141 or the second folding line 142 of a single oblique line or a vertical line.

Therefore, the embossed portion 150 enables a specific area of the first cover unit corresponding to the wireless communication chip to be formed with an increased thickness by the height of the convex, and hence, when the cover unit of the ear tag is bent by an external force, a site on which the stress is concentrated is moved to an area distant from the wireless communication chip by the folding line and the specific area of the cover unit is reinforced by the embossed portion, so that the wireless communication chip can be prevented from being damaged by the external force and being electrically disconnected from the antenna radiation pattern.

Although exemplary embodiments of the present disclosure have been described for illustrative purposes, those skilled in the art will appreciate that various modifications, additions and substitutions are possible, without departing from the idea and scope of the claimed disclosure. Accordingly, one of ordinary skill would understand the scope of the claimed disclosure is not to be limited by the explicitly described above embodiments but by the claims and equivalents thereof.

The invention claimed is:

1. An ear tag for recognizing livestock individual, comprising:
a cover unit including a first cover unit and a second cover unit, the first cover unit facing a skin side of livestock, the first cover unit and the second cover unit integrally coupled with each other;
a wireless communication unit arranged between the first cover unit and the second cover unit and including at least one wireless communication chip;
a male plug configured to penetrate through a part of a body of the livestock and a through hole formed on the first cover unit and including a distal end configured to be engaged with a space of a female unit formed on the second cover unit;
a folding portion including at least one second folding line formed in a groove with a predetermined length on the cover unit in an area close to the wireless communication chip without being overlapped with the wireless communication chip and corresponding to the wireless communication unit to allow a stress caused by an external force to be concentrated on the folding portion so that the cover unit is folded along the second folding line when the cover unit is bent; and
wherein the second folding line includes an oblique line having a predetermined angle with a virtual vertical line passing the wireless communication chip.

2. The ear tag for recognizing livestock individual according to claim 1, wherein the second folding line is formed on the cover unit on one side corresponding to the wireless communication chip included in the wireless communication unit.

3. The ear tag for recognizing livestock individual according to claim 1, wherein the second folding line is formed with both ends extended to respective outer edges of the cover unit.

4. The ear tag for recognizing livestock individual according to claim 1, further comprising an embossed portion convex by a predetermined height on the outer surface of the cover unit corresponding to the wireless communication chip.

5. An ear tag for recognizing livestock individual, comprising:
a cover unit including a first cover unit and a second cover unit, the first cover unit facing a skin side of livestock, the first cover unit and the second cover unit integrally coupled with each other;
a wireless communication unit arranged between the first cover unit and the second cover unit and including at least one wireless communication chip;
a male plug configured to penetrate through a part of a body of the livestock and a through hole formed on the first cover unit and including a distal end configured to be engaged with a space of a female unit formed on the second cover unit;
a folding portion including at least one second folding line formed in a groove with a predetermined length on the cover unit in an area close to the wireless communication chip without being overlapped with the wireless communication chip and corresponding to the wireless communication unit to allow a stress caused by an external force to be concentrated on the folding portion so that the cover unit is folded along the second folding line when the cover unit is bent; and
wherein the second folding line includes a plurality of oblique lines having predetermined angles in opposite directions with a virtual vertical line passing the wireless communication chip in a manner that the plurality of oblique lines intersect with each other around the wireless communication chip.

6. An ear tag for recognizing livestock individual, comprising:
a cover unit including a first cover unit and a second cover unit, the first cover unit facing a skin side of livestock, the first cover unit and the second cover unit integrally coupled with each other;
a wireless communication unit arranged between the first cover unit and the second cover unit and including at least one wireless communication chip;
a male plug configured to penetrate through a part of a body of the livestock and a through hole formed on the first cover unit and including a distal end configured to be engaged with a space of a female unit formed on the second cover unit; and
a folding portion including at least one second folding line formed in a groove with a predetermined length on the cover unit in an area close to the wireless communication chip without being overlapped with the wireless communication chip and corresponding to the wireless communication unit to allow a stress caused by external force to be concentrated on the folding portion so that the cover unit is folded along the second folding line when the cover unit is bent; and
wherein the second folding line includes a vertical line parallel to a virtual vertical line passing the wireless communication chip.

* * * * *